US008282059B2

(12) United States Patent  
Monaco

(10) Patent No.: US 8,282,059 B2
(45) Date of Patent: Oct. 9, 2012

(54) INCREMENTAL ANGULAR POSITION AND LOCKING SYSTEM FOR MOUNTING DEVICES

(75) Inventor: Garry A. Monaco, Hoffman Estates, IL (US)

(73) Assignee: Peerless Industries, Inc., Aurora, IL (US)

( * ) Notice: Subject to any disclaimer, the term of this patent is extended or adjusted under 35 U.S.C. 154(b) by 0 days.

(21) Appl. No.: 13/241,861

(22) Filed: Sep. 23, 2011

(65) Prior Publication Data

US 2012/0012724 A1    Jan. 19, 2012

Related U.S. Application Data

(63) Continuation of application No. 11/652,846, filed on Jan. 12, 2007, now Pat. No. 8,028,964.

(60) Provisional application No. 60/758,718, filed on Jan. 13, 2006.

(51) Int. Cl.
*E04G 3/00* (2006.01)

(52) U.S. Cl. .................. 248/284.1; 248/299.1; 248/923

(58) Field of Classification Search ............. 248/292.14, 248/299.1, 919, 920, 921, 922, 923, 284.1, 248/285.1, 286.12, 282.1
See application file for complete search history.

(56) References Cited

U.S. PATENT DOCUMENTS

| 153,943 | A | 8/1874 | Gray |
|---|---|---|---|
| 3,001,225 | A | 9/1961 | Squire |
| 4,560,129 | A | 12/1985 | Clayton |
| 5,058,842 | A | 10/1991 | Zemlin et al. |
| 5,102,081 | A | 4/1992 | Barchus |
| 5,209,446 | A | 5/1993 | Kawai |
| 5,344,194 | A | 9/1994 | Hatagishi et al. |
| 5,553,820 | A | 9/1996 | Karten et al. |
| 5,632,463 | A | 5/1997 | Sung et al. |
| 5,941,497 | A * | 8/1999 | Inoue et al. .................... 248/514 |
| 6,045,103 | A | 4/2000 | Costa et al. |
| 6,098,562 | A | 8/2000 | Förthmann |
| 6,273,382 | B1 | 8/2001 | Pemberton |
| 6,402,109 | B1 | 6/2002 | Dittmer |
| 6,409,127 | B1 | 6/2002 | VanderHeide et al. |
| D493,800 | S | 8/2004 | Pfister et al. |
| D494,596 | S | 8/2004 | Pfister |
| D497,537 | S | 10/2004 | O'Keene et al. |
| 6,905,101 | B1 | 6/2005 | Dittmer |
| 7,028,961 | B1 | 4/2006 | Dittmer et al. |
| D530,595 | S | 10/2006 | Lam et al. |
| 7,152,836 | B2 | 12/2006 | Pfister et al. |
| 7,178,775 | B2 | 2/2007 | Pfister et al. |
| D563,962 | S | 3/2008 | Grey |
| 7,438,269 | B2 * | 10/2008 | Pfister et al. ............. 248/292.14 |
| 7,466,554 | B2 | 12/2008 | Matsumoto et al. |
| 2007/0023593 | A1 | 2/2007 | Fedewa |
| 2007/0090250 | A1 * | 4/2007 | O'Keene .................... 248/299.1 |

* cited by examiner

*Primary Examiner* — Amy Sterling
*Assistant Examiner* — Steven Marsh
(74) *Attorney, Agent, or Firm* — Foley & Lardner LLP

(57) ABSTRACT

A mounting system comprising an incremental angular position and locking system. A tilt bracket is configured to operatively connect to a surface, and an adapter bracket is operatively and movably connected to the tilt bracket, with the adapter bracket being configured to operatively connect to an object such as an audio/video device. A plurality of angular position features are associated with one of the tilt bracket and the adapter bracket, and an angular positioning element is configured to selectively engage at least one of the plurality of angular position features. When the angular positioning element is in engaged with at least one angular position feature, the adapter bracket is impeded from moving relative to the tilt bracket. When the angular positioning element is not in engagement with at least one angular position feature, the adapter bracket is substantially free to move relative to the tilt bracket.

17 Claims, 3 Drawing Sheets

INCREMENTAL ANGULAR POSITION AND LOCKING SYSTEM FOR MOUNTING DEVICES

CROSS-REFERENCE TO RELATED APPLICATIONS

The present application is a continuation of U.S. patent application Ser. No. 11/652,846, filed Jan. 12, 2007. U.S. patent application Ser. No. 11/652,846 claims priority to U.S. Provisional Patent Application No. 60/758,718, filed Jan. 13, 2006. Both applications are incorporated herein by reference in their entirety.

FIELD OF THE INVENTION

The present invention relates generally to tilt systems. More particularly, the present invention relates to audio and/or video tilt systems that enable a user to position an attached device in a variety of orientations.

BACKGROUND OF THE INVENTION

In recent years, flat-panel television units have become enormously popular in both the commercial and the residential sectors. As the prices for plasma and liquid crystal display (LCD) flat panel displays have continued to fall, and as the quality for the same devices have improved, more and more businesses and individuals have purchased such devices both for business and home entertainment purposes.

One of the advantages of flat-panel television units that customers have found particularly appealing is their relatively low thickness. Because conventional "tube" televisions have a relatively large depth, the display options for such devices are quite limited. In the residential setting, most users require a television stand or large entertainment center to store the television. Such stands or entertainment centers can take up significant floor space, which is often undesirable. In the commercial or educational setting, users will often install large overhead tilt systems that can contain the television. However, these systems usually require professional installation and, once the television is secured in the mount, it is often very difficult to access and adjust due to its height.

With flat-panel televisions, on the other hand, users are presented with a relatively new option: tilt the television directly to a wall or similar surface. By tilting the television relative to a wall, a person can eliminate the need to take up potentially valuable floor space with a television stand or entertainment unit. Furthermore, individuals and entities can mount the television at a sufficiently low height to be able to adjust the television's orientation with little difficulty.

Although the introduction of flat-panel televisions on a wide scale has presented new opportunities to both residential and commercial customers, it has also presented new challenges. Over the past few years, a number of wall tilt systems have been developed for use with flat panel televisions, but each has their own drawbacks. For example, U.S. Pat. No. 6,905,101 discloses a wall tilt system that permits a flat panel television to have a limited range of motion once it is mounted to the wall. The products described in these disclosures rely upon the use of a set of curved slots to form a rotatable connection between a tilt bracket and a support bracket, with rolling pins being used to create a rolling connection between the two brackets. Similarly, U.S. Application Publication No. 2004/0245420 discloses a tilt system where a plurality of arc-shaped glides are used instead of rolling pins.

Although such systems are moderately useful, they suffer from a number of important drawbacks. Such systems often rely upon friction knobs or other friction-based mechanisms both to control the amount of resistance during the adjustment process, as well as to maintain a particular angular orientation once the positioning process has been completed. However, these friction-based mechanisms do not definitely "lock" the respective brackets in place, and these mechanisms can be forced from their set positions. As a result, even a slight bump of the flat screen unit can cause the orientation of the mount to be altered. In many settings, once the mount has been correctly positioned, it will not be (or will only infrequently be) readjusted. In such situations, accidental movement of the mount is especially undesirable.

It would therefore be desirable to provide an adjustable tilt system that enables a user to more securely fix the orientation of the mount once a desired orientation has been attained.

SUMMARY OF THE INVENTION

The present invention provides an improved tilt system including an incremental angular position and locking system. According to various embodiments of the present invention, an adapter bracket is slidably and/or rollingly engaged with a tilt bracket. One of the adapter bracket and the tilt bracket includes a plurality of angular positioning portions along at least one side wall thereof The other of the adapter bracket and the tilt bracket includes a locator portion on at least one side wall thereof The locator portion is positioned to selectively align with the various angular positioning portions depending upon the particular orientation of the adapter bracket relative to the tilt bracket. When a locator portion is aligned with one of the angular positioning portions, the user can use a locking member to fix the position of the tilt bracket relative to the adapter bracket.

With the present invention, a user is capable of effectively fixing the angular orientation of the tilt system, and therefore an attached device, once a desired angular orientation has been achieved, while still providing a user with a large degree of autonomy in selecting the desired orientation. Additionally, when these systems are used in an "array" format, the present invention allows for all of the individual mounting systems in the array to be positioned and locked at the same angular orientation from one unit to the next. This allows the array of mounted audio/visual products to be oriented in a highly organized, professional and orderly manner, making the use of the mounting systems more efficient.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
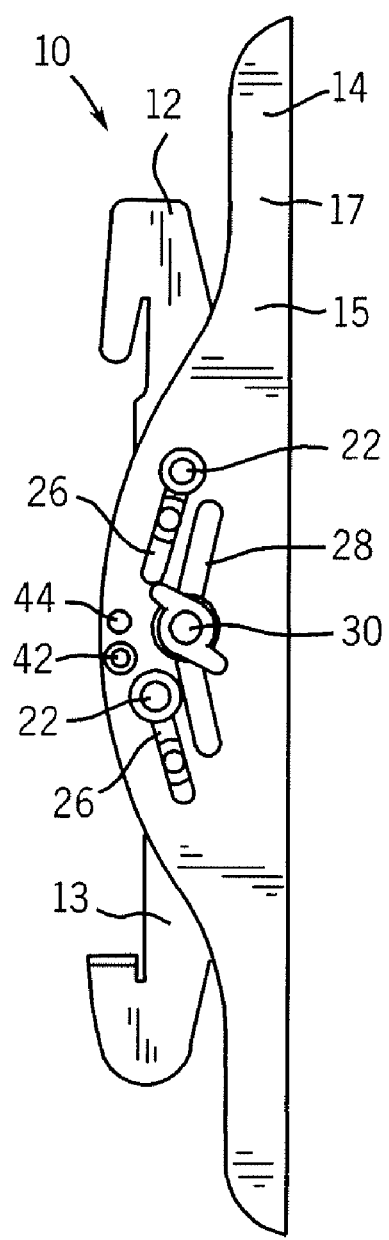
FIG. 1 is a perspective view of an adjustable tilt system with an angular position and locking mechanism constructed according to a first embodiment of the present invention.

FIG. 1 shows an adjustable mounting system 10 constructed in accordance with a first embodiment of the present invention. The adjustable mounting system 10 of FIG. 1 comprises a tilt bracket 12 which is configured to engage a retaining member (not shown) which can be affixed to a wall, floor pedestal, ceiling mount, or other surface. The tilt bracket 12 includes a tilt bracket engagement portion 11 and a pair of tilt bracket flanges 13 on each side thereof. It should also be noted, however, that the tilt bracket 12 can be directly secured to a wall, floor pedestal, ceiling mount, or other surface instead of engaging one or more retaining members. The tilt bracket 12 can also be connected to the wall, floor pedestal, ceiling mount, or other surface via several intermediate components, such as an articulating arm (not shown) or other brackets or plates. These various components can be used to translate an attached electronic device away from or towards the wall, floor pedestal, ceiling mount, or other surface, to tilt the electronic device to the left or right, or for other purposes.

In the embodiments shown in FIG. 1, an adapter bracket 14 is rotatably coupled to the tilt bracket 12. The adapter bracket 14 includes an adapter bracket contact portion 15 bounded by a pair of adapter bracket flanges 17 on each side thereof in one embodiment of the invention. In this particular embodiment, the adapter bracket 14 is attached directly to the respective electronic device (not shown). However, it should also be noted that, in other embodiments of the invention, a display bracket (not shown) can be secured to the adapter bracket contact portion 15, with the display bracket being configured to attach to a flat panel display or other electronic device.

As shown in FIG. 1, the tilt bracket 12 includes a plurality of tilt bracket guide paths 24, and the adapter bracket 14 includes a plurality of adapter bracket guide paths 26. FIG. 1 shows the tilt bracket guide paths 24 and adapter bracket guide paths 26 as slots that are formed completely within the tilt bracket 12 and adapter bracket 14, respectively. However, it should be understood that the present invention is not strictly limited to the use of slots. Instead, guide paths for the tilt bracket 12 and the adapter bracket 14 can comprise items such as rails and outer surfaces that define a path of travel, as well as other structures that provide guide paths. The present invention should therefore not be strictly limited to the use of slots.

Both the tilt bracket guide paths 24 and the adapter bracket guide paths 26 are sized to accept a carrier 22 therethrough. In one embodiment, the carriers 22 comprise rolling pins. However, other types of carriers, such as gliders or other items, could also be used. In one particular embodiment of the invention, two rolling pins are used, with one rolling pin passing through the uppermost tilt bracket guide paths 24 and adapter bracket guide paths 26 on each of the respective flanges, and another rolling pin passing through the lowermost tilt bracket guide paths 24 and adapter bracket guide paths 26 on each of the respective flanges.

In the embodiment of the invention shown in FIG. 1, each guide path is substantially straight in nature. While the tilt bracket guide paths 24 and the adapter bracket guide paths 26 can also be curved, the use of straight guide paths creates a "scissoring" action which diminishes sliding and promotes the smooth movement of the carrier mechanisms with the guide paths. The substantially straight guide paths also aid in ensuring that the carrier mechanisms do not slip when a user or installer lifts and removes the electronic device from the remainder of the adjustable mounting system 10.

The tilt bracket guide paths 24 are located on the tilt bracket flanges 13, and the adapter bracket guide paths 26 are located on the adapter bracket flanges 17. In one embodiment of the invention, each tilt bracket flange 13 includes two tilt bracket guide paths 24, and each adapter bracket flange 17 includes two adapter bracket guide paths 26, each of which are configured to align with a respective tilt bracket guide slot 24.

The embodiment of the invention shown in FIG. 1 also includes a friction member 30 for adjusting the level of resistance that is met during the adjustment process. In one particular embodiment, the friction member 30 includes an adjustment screw that passes through both a friction slot 28 in the adapter bracket flange 17, shown in FIG. 3 and a friction hole 29 in the corresponding tilt bracket flange 13, shown in FIG. 2. It should be noted that the friction hole 29 and friction slot 28 can also be reversed, such that the friction slot 28 appears on the tilt bracket 12. It is also possible to include two friction slots instead of one friction slot and one friction hole. A plurality of washers 31 may also be used along with the adjustment screw. In this embodiment of the invention, a clockwise rotation of the adjustment screw causes the respective adapter bracket flange 17 and tilt bracket flange 13 to come into closer contact with each other, which results in an increased level of friction when the user moves the electronic device (and therefore the adapter bracket 14) relative to the tilt bracket 12. A counterclockwise rotation of the adjustment screw correspondingly reduces the friction level between the tilt bracket 12 and the adapter bracket 14. It should be understood that other types of friction devices may also be used, and that these friction devices may or may not include an adjustment screw of the type described herein.

Figure 2:
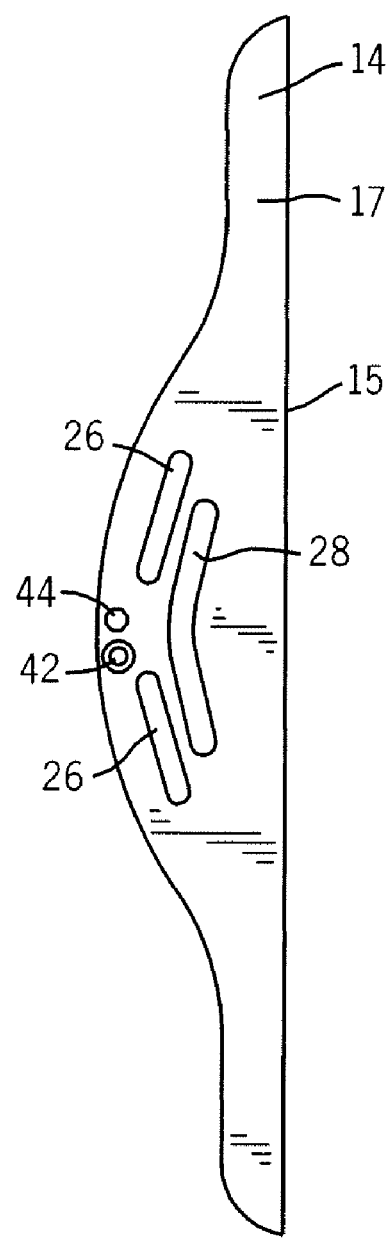
FIG. 2 is a side view of the tilt bracket of FIG. 1.

As shown in FIG. 2, the tilt bracket 12 also includes a plurality of angular position features 40 on at least one of the tilt bracket flanges 13. In the embodiment depicted in FIG. 2, the angular position features 40 comprise holes in the tilt bracket flange(s) 13. However, it should be noted that other features, such as slots, could also be used. The angular position features 40 are strategically placed to track the tilting motion of the adjustable mounting system 10 for the purposes described below.

Figure 3:
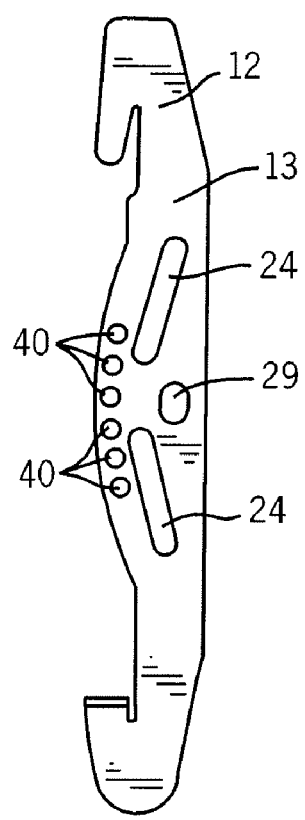
FIG. 3 is a side view of the adapter bracket of FIG. 1.
Figure 4:
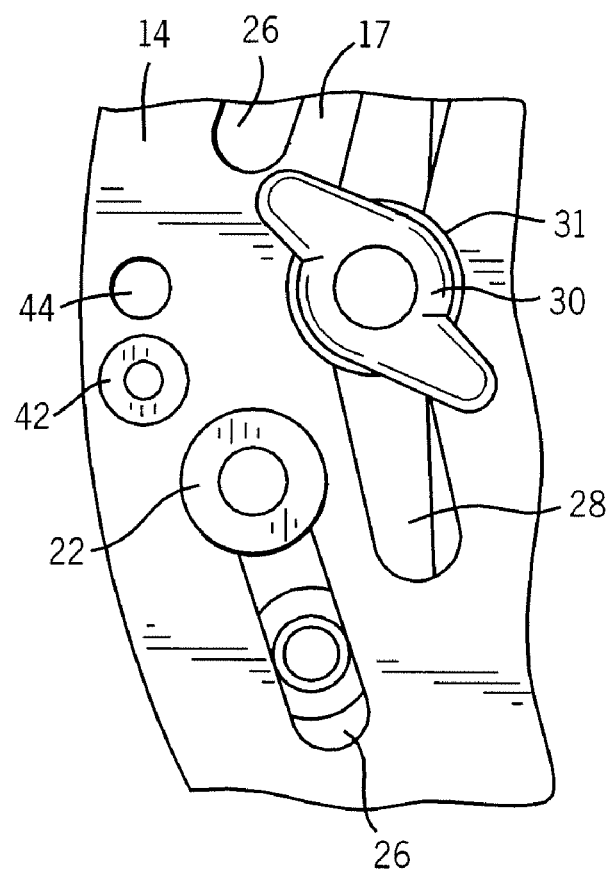
FIG. 4 is a magnified view of an adapter bracket with various components attached thereto.

FIG. 3 is a side view of the adapter bracket 14 of FIG. 1. The adapter bracket 14 includes an angular positioning element 42 that passes through a locking feature (shown at 43 in FIG. 7) within the adapter bracket flanges 17. The angular positioning element can comprise a screw or similar item. The locking feature 43 can comprise a hole, slot, or other item which is capable of cooperating with the angular positioning element 42.

The operation of the present invention is generally as follows. As discussed above, the tilt bracket 12 is directly or indirectly attached to a surface such as a wall, while the adapter bracket 14 is directly or indirectly attached to an object to be mounted. As discussed previously, the object may comprise an audio/visual device such as a flat screen television. However, a wide variety of other objects can also be mounted using the adjustable mounting system 10 of the present invention. Once the object is mounted, the user can adjust the angular tilt of the object by simply rotating the object, which causes the adapter bracket 14 to rotate relative to the tilt bracket 12.

In the embodiments shown in FIGS. 1-4, the adapter bracket 14 rotates about an axis that runs substantially parallel to adapter bracket flanges 17 and tilt bracket flanges 13, as well as about an axis substantially parallel to the wall or other surface to which the adjustable mounting system 10 is attached. This rotation is also about an axis substantially parallel to the tilt bracket engagement portion 11. However, it is also possible for some or all of these orientations to be altered. For example, if the tilt bracket 12 is coupled to an articulating arm with different degrees of movement, then the axis of rotation of the adjustable mounting system 10 may be different than substantially parallel to the wall or other surface. During the rotation process, adjusting the friction member 30 allows the user to control the amount of resistance that is encountered while rotating the adapter bracket 14.

When the user has positioned the adapter bracket 14 relative to the tilt bracket 12 to his her own satisfaction, he or she uses the angular positioning element 42 to secure the position of the adapter bracket 14. In the situation where the angular positioning element 42 comprises a screw, pin, spring loaded pin, locking pin, clevis pin, clevis pin with lanyard, pin with ball detent, or similar fastener, this is accomplished by passing the angular positioning element 42 through the locking feature 43 and the angular position features 40 which most closely aligns with the angular positioning element 42. Because there is a certain amount of space between the angular position features 40, it is possible that a very slight adjustment of the adapter bracket 14 may be necessary in order to create the proper alignment. Once the angular positioning element 42 has been secured with the proper angular position features 40, the adapter bracket 14 is prevented from further rotation. If a user later wants to readjust the orientation of the object about the axis created by the sliding or rolling connection depicted in FIG. 1, he or she simply has to disengage the angular positioning element 42 from the respective angular position feature 40.

The engagement and disengagement of the angular positioning element 42 can take a variety of forms. For example, in a case where the angular positioning element 42 comprises a simple screw, then the screw may, when not engaged with an angular position features 40, may not be engaged with the locking feature 43 either. Alternatively, the screw or other angular positioning element 42 may, in the default position, be nested within the locking feature 43 such that it only needs to be "pushed into" the appropriate angular position feature for locking to occur. This provides the benefit of not having to worry about losing the angular positioning element 42 during the adjustment process.

As shown in FIG. 3, one embodiment of the adjustable mounting system 10 also includes an alignment feature 44 strategically positioned relative to the locking feature 43 and the angular positioning element 42. The alignment feature 44 is utilized by the user to quickly and easily align the tilt bracket 12 and the adapter bracket 14 so that the locking system can be used. In particular, the angular position features 40 are positioned such that, if one of the angular position features 40 is aligned with the locking feature 43, then the alignment feature 44 will indicate the presence of such an alignment. In the embodiment shown in FIGS. 1-4, the alignment feature 44 comprises a visual alignment feature in the form of a hole. Therefore, when one of the angular position features 40 is aligned with the locking feature 43, the user will be able to see another of the angular position features 40 through the alignment feature 44.

In the embodiment shown in FIGS. 1-4, the alignment feature 44 is shown as being positioned substantially above the locking feature 43. In such a case, it is possible that, if a user wants to use the upper most angular position features 40 for alignment and locking, the user may not observe the alignment through the alignment feature 44. To resolve this issue, one could use a "dummy" angular position feature (not shown), solely for the purpose of using the alignment feature 44. For example, the tilt bracket flanges 13 could include a colored marking where the next angular position features 40 would otherwise have been located, or a "dummy" hole that is too small for locking purposes could be used instead of a marking. Other types of "dummy" features could also be used in such a situation, and the location of this feature can be positioned to strategically correlate to the requirements set by the location of the alignment feature 44. Other systems to demarcate angular position include but are not limited to angular scales and/or numbered readouts that are visible through the alignment feature 44.

It should be noted that, although the alignment feature 44 comprises a hole in the embodiment shown in FIGS. 1-4, it is also possible for the alignment feature to comprise a slot or similar visual indicator. Additionally, it is also possible for the alignment feature 44 to not be visual in nature in other embodiments. For example, the alignment feature can comprise a structure that creates an audible "click" or similar sound when a proper alignment has been attained. Other types of alignment features would also be understood to be applicable by those skilled in the art.

Figure 5:
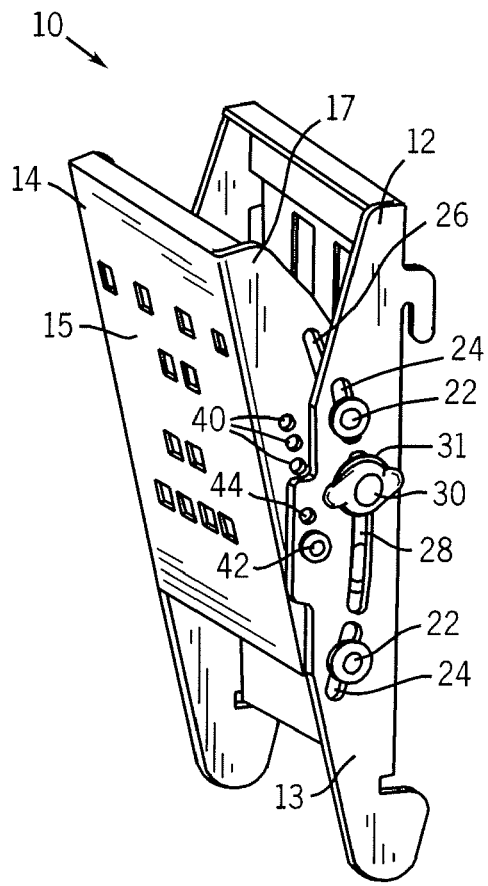
FIG. 5 is a perspective view of an adjustable tilt system with an angular position and locking mechanism constructed according to a second embodiment of the present invention.
Figure 6:
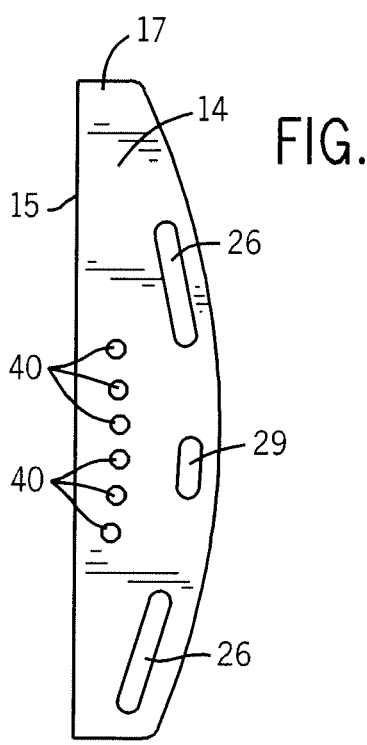
FIG. 6 is a side view of the adapter bracket of FIG. 5.
Figure 7:
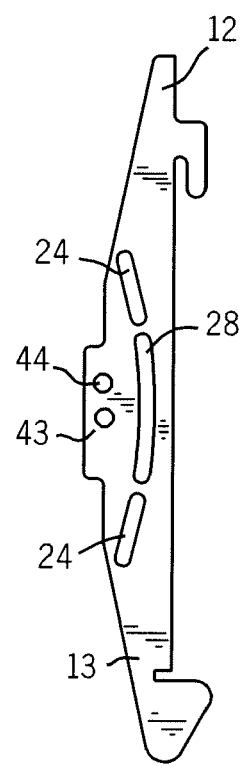
FIG. 7 is a side view of the tilt bracket of FIG. 5.

Additionally, it should also be noted that many of the components depicted and described herein can essentially be reversed while still achieving the intended results of the present invention. For example, in the embodiments shown in FIGS. 1-4, the tilt bracket flanges 13 are positioned outside of the respective corresponding adapter bracket flanges 17. However, it is possible that the tilt bracket flanges 13 can be positioned inside of the corresponding adapter bracket flanges 17. In such a scenario, the angular positioning features 40 can be located on the adapter bracket 14, and the tilt bracket 12 can include the locking feature 43 and the alignment feature 44 can be located on the adapter bracket 14. FIGS. 5-7 show such an embodiment of the present invention. Although FIGS. 5-7 show a structure that is similar to the structure depicted in FIGS. 1-4, these figures show that the various components are capable of being formed in a variety of shapes and sizes. For this reason, it should be understood that the various components used in the present invention should not be interpreted as being limited to the shapes and sizes depicted herein. Other arrangements and combinations would also be understood by those in the art.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplate.

The invention claimed is:

1. A mounting system, comprising:
    a first bracket configured to operatively connect to a surface;
    a second bracket configured to operatively connect to an audio/visual device, the first bracket movably connected to the second bracket via one of at least one glider and at least one pin such that the first bracket is selectively tiltable relative to the second bracket;
    a plurality of substantially circular angular position features located on one of the first bracket and the second bracket, each of the plurality of angular position features associated with a respective discrete tilt angle of the second bracket relative to the first bracket; and an angular positioning element configured and sized to selectively mate individually with each of the plurality of angular position features, wherein, for each angular position feature, when the angular positioning element is positioned within the angular position feature and also passes through an opening on the other of the first bracket and the second bracket, the first bracket is prevented from moving from a respective discrete tilt angle defined by the second bracket relative to the first bracket, and wherein when the angular positioning element is not positioned within any of the plurality of angular position features, the second bracket is substantially free to move relative to the first bracket.

2. The mounting system of claim 1, wherein the plurality of angular position features are arranged along an arc on the first bracket.

3. The mounting system of claim 1, wherein the plurality of angular position features are arranged along an arc on the second bracket.

4. The mounting system of claim 1, wherein the plurality of angular position features comprise a plurality of angular alignment holes formed within the one of the first bracket and the second bracket, and wherein the angular positioning element is configured to selectively engage at least one of the plurality of angular alignment holes to selectively impede the movement of the second bracket relative to the first bracket.

5. The mounting system of claim 4, wherein the angular positioning element comprises a fastener configured to individually and selectively pass through the plurality of angular alignment holes.

6. The mounting system of claim 1, wherein the one of the first bracket and the second bracket that does not include the plurality of angular position holes includes at least one locking feature that at least selectively engages the angular positioning element.

7. A mounting system, comprising:
a first bracket configured to operatively connect to a surface;
a second bracket configured to operatively connect to an audio/visual device, the first bracket movably connected to the second bracket via a carrier such that the first bracket is selectively tiltable relative to the second bracket;
a plurality of angular position features arranged along an arc and located on one of the first bracket and the second bracket, each of the plurality of angular position features associated with a respective discrete tilt angle, the plurality of angular position features comprising a plurality of angular alignment holes formed within the one of the first bracket and the second bracket; and
an angular positioning element configured and sized to selectively mate individually with each of the plurality of angular position features, the angular positioning element configured to individually and selectively engage the plurality of angular alignment holes to impede the movement of the second bracket relative to the first bracket,
wherein, for each angular position feature, when the angular positioning element enters the angular position feature and is also operatively engaged with the other of the first bracket and the second bracket, the second bracket is impeded from moving from the respective discrete tilt angle defined by the angular position feature, and wherein when the angular positioning element is not positioned within any of the plurality of angular position features, the second bracket is substantially free to move relative to the first bracket.

8. The mounting system of claim 7, wherein the angular positioning element comprises a fastener configured to individually and selectively pass through the plurality of angular alignment holes.

9. The mounting system of claim 8, wherein the one of the first bracket and the second bracket that does not include the plurality of angular position holes includes at least one locking feature that at least selectively engages the angular positioning element.

10. The mounting system of claim 9, wherein the angular positioning element is capable of engaging at least one of the plurality of angular position holes when the at least one locking feature is aligned with the at least one of the plurality of angular position holes.

11. The mounting system of claim 7, wherein the plurality of angular position features are located on the first bracket.

12. A mounting system, comprising:
a first bracket configured to operatively connect to a surface;
a second bracket configured to operatively connect to an audio/visual device, the first bracket movably connected to the second bracket via a carrier such that the first bracket is selectively tiltable relative to the second bracket;
a plurality of angular position features arranged along an arc and located on the second bracket, each of the plurality of angular position features associated with a respective discrete tilt angle; and
an angular positioning element configured and sized to selectively mate individually with each of the plurality of angular position features,
wherein, for each angular position feature, when the angular positioning element enters the angular position feature and is also operatively engaged with the first bracket, the second bracket is impeded from moving from the respective discrete tilt angle defined by the angular position feature, and wherein when the angular positioning element is not positioned within any of the plurality of angular position features, the second bracket is substantially free to move relative to the first bracket.

13. A mounting system, comprising:
a first bracket configured to operatively connect to a surface, the first bracket including a plurality of first bracket guide paths;
a second bracket operatively connected to the first bracket, the second bracket including a plurality of second bracket guide paths, the second bracket configured to operatively connect to an object;
at least one carrier engaging both the first bracket and the second bracket and permitting an orientation of the second bracket to adjust relative to the first bracket, the least one carrier engaging at least one of the plurality of first bracket guide paths and at least one of the plurality of second bracket guide paths;
a plurality of angular position features associated with a plane defined by one of the first bracket and the second bracket, each of the plurality of angular position features configured to fix a respective predetermined angle between the second bracket and the first bracket, where at least one predetermined angle is an intermediate angle; and an angular positioning element being sized and configured to selectively mate with each of the plurality of angular position features, wherein when the angular positioning element is received by at least one angular position feature and is also engaged with the other of the first bracket and the second bracket, the respective predetermined angle between the second bracket and the first bracket is fixed and the second bracket is impeded from moving relative to the first bracket, and wherein when the angular positioning element is not in receipt with at least one angular position feature, the second bracket is not restrained by the angular positioning element from moving relative to the first bracket.

14. The mounting system of claim 13, wherein the plurality of angular position features are substantially circular in shape.

15. The mounting system of claim 14, wherein the angular positioning element is substantially circular in shape.

16. The mounting system of claim 13 wherein the plurality of angular position features are arranged along an arc on the first bracket.

17. The mounting system of claim 13, wherein the plurality of angular position features are arranged along an arc on the second bracket.

* * * * *